United States Patent [19]

Roach, Jr. et al.

[11] Patent Number: 5,797,097

[45] Date of Patent: Aug. 18, 1998

[54] METHOD AND APPARATUS FOR IDENTIFYING THE LOCATION OF A ROAMING PAGER

[75] Inventors: Peter Owen Roach, Jr., Atlanta; Edward Irby Comer, Marietta, both of Ga.

[73] Assignee: BellSouth Corporation, Atlanta, Ga.

[21] Appl. No.: 551,952

[22] Filed: Nov. 2, 1995

[51] Int. Cl.$^6$ .............................. H04M 11/00; H04B 7/00
[52] U.S. Cl. ........................................ 455/456; 340/825.36
[58] Field of Search .............................. 379/57, 63, 59, 379/115, 118; 455/33.1, 426, 440, 444, 456; 340/825.44, 825.49, 825.52, 825.36

[56] References Cited

U.S. PATENT DOCUMENTS

| | | |
|---|---|---|
| 4,644,347 | 2/1987 | Lucas et al. . |
| 4,833,701 | 5/1989 | Comroe et al. . |
| 4,891,638 | 1/1990 | Davis . |
| 4,901,340 | 2/1990 | Parker et al. . |
| 4,972,460 | 11/1990 | Sasuta . |
| 5,020,091 | 5/1991 | Krolopp et al. . |
| 5,121,503 | 6/1992 | Davis . |
| 5,153,902 | 10/1992 | Buhl et al. . |
| 5,175,758 | 12/1992 | Levanto et al. . |
| 5,196,842 | 3/1993 | Gomez et al. . |
| 5,206,855 | 4/1993 | Schwendeman et al. . |
| 5,230,081 | 7/1993 | Yamada et al. ........................ 455/456 |
| 5,254,986 | 10/1993 | DeLuca . |
| 5,255,307 | 10/1993 | Mizikovshy . |
| 5,278,890 | 1/1994 | Beeson, Jr. et al. ................... 379/57 |
| 5,335,278 | 8/1994 | Matchett et al. . |
| 5,369,681 | 11/1994 | Boudreau et al. ................. 379/59 X |
| 5,432,841 | 7/1995 | Rimer ................................... 455/457 |
| 5,526,401 | 6/1996 | Roach, Jr. et al. ................ 455/33.1 X |
| 5,553,094 | 9/1996 | Sanmugam ........................... 379/57 |
| 5,574,975 | 11/1996 | Hill ...................................... 455/33.1 |
| 5,594,945 | 1/1997 | Lewis et al. ...................... 455/54.1 X |
| 5,603,091 | 2/1997 | Linquist et al. .................... 455/13.2 |
| 5,619,209 | 4/1997 | Horstein et al. ................ 455/13.1 X |
| 5,629,975 | 5/1997 | Tiedemann, Jr. et al. ............. 379/60 |
| 5,875,863 | 12/1995 | Simpson et al. ....................... 455/458 |

*Primary Examiner*—David R. Hudspeth
*Assistant Examiner*—Scott Richardson
*Attorney, Agent, or Firm*—Jones & Askew

[57] ABSTRACT

A system for communicating location data regarding the present service area for a "roaming" cellular paging device in a paging system. Each cellular paging device monitors a cellular network control channel to detect a cellular system identification signal transmitted by a cellular mobile radiotelephone (CMR) system. If the cellular system identification signal does not match a preassigned code for a host CMR system associated with the paging system, it responds by transmitting an identification signal to the MSC via the cellular network control channel. This identification signal includes: (1) a unique identification code that identifies the source of the identification signal, and (2) at least a portion of the system identification signal that was received by the cellular paging device. The CMR system determines that the identification signal has been transmitted by a "roaming" device associated with another CMR system and, accordingly, sends the identification signal to a verification system. In turn, the verification system communicates with the paging system to update the current service location of the cellular paging device. This allows the paging system to send pages to the service area where the paging device is actually located rather than sending pages to all possible service areas.

37 Claims, 4 Drawing Sheets

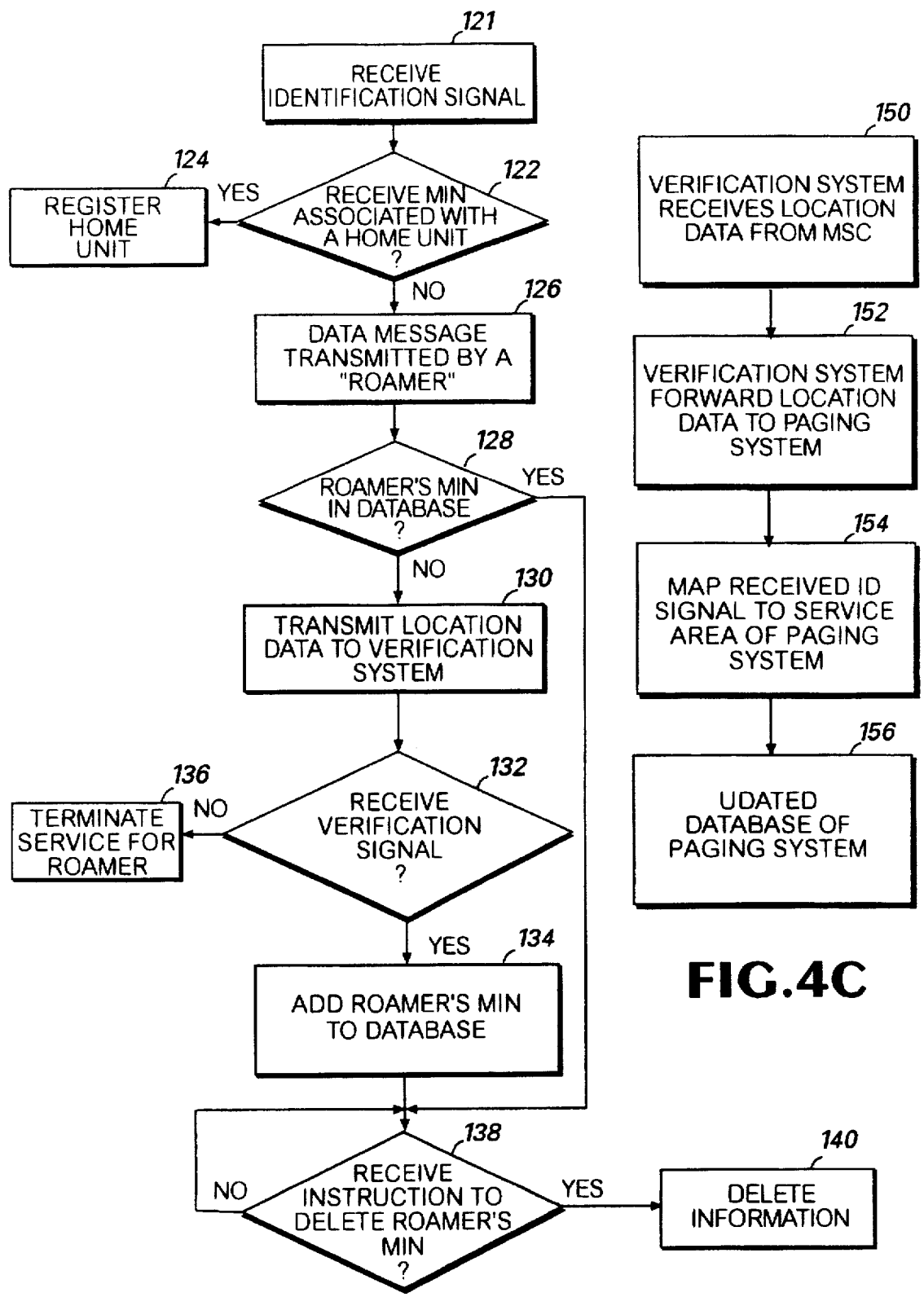

1

METHOD AND APPARATUS FOR IDENTIFYING THE LOCATION OF A ROAMING PAGER

TECHNICAL FIELD

The present invention relates generally to a paging system, and more particularly relates to a method and apparatus for identifying the location of a paging device that a subscriber has moved to a new service area of a segmented paging system.

BACKGROUND OF THE INVENTION

Since first coming into use in the 1970's, over-the-air personal paging devices have become very popular in the United States and other countries. Generally, a paging device, which is also described as a pager, is a small, portable, addressable, radio frequency (RF) receiving device that may be easily carried on a person. A paging device can receive some form of message within the coverage area of the transmitting apparatus for the paging system with which the device is associated. Paging systems include pagers and at least one paging terminal having a transmitter that covers a selected geographic area containing numerous pagers. A pager is generally tuned to a tone or data bit-modulated radio frequency that is shared with many other pagers. A particular sequence of tones or data bits is used as an address or the identification of a selected pager. The reception of the particular sequence by a pager activates an acoustic, tactile, or visible alert, thereby indicating that a call has been placed to the paging terminal from a telephone connected to the public switched telephone network (PSTN) and generally communicated via the transmitter to the pager.

The earliest forms of pagers were activated by a transmitted message containing address information specifically directing it to the pager. Early devices simply beeped or vibrated to alert the user that a message had been received, and were often referred to as "beepers" in the common vernacular. The user would normally take a predetermined action, such as calling his or her office, when the pager was activated. Although early paging systems covered major metropolitan areas, there existed no mechanism, save acquiring multiple pagers, for making a person pageable in a number of different cities.

Recent innovations include digital and voice pagers capable of receiving encoded messages to call specific telephone numbers and short audio segments. Still more recently, pagers for receiving, storing and displaying alphanumeric messages have come into use. Depending upon the complexity of the pager, the paging device may receive a voice or a data message following an alert, or the alert itself may simply indicate to the user that a call was made and a prearranged action should be taken.

The needs of many businesses to contact individuals who travel throughout the United States have lead to the allocation of frequency spectrum by the Federal Communications Commission to three nationwide paging systems. A nationwide paging system allows a subscriber to be contacted in any one of many metropolitan areas throughout the United States. One such nationwide paging system in the United States is operated by Mobile Communications Corporation of America ("Mobil Comm"), a subsidiary of the assignee of the present invention, and is known as its "CITYLINK" paging service.

The addressability of a pager is determined by a unique identifier stored within the pager. The unique identifier may be considered analogous to a telephone number. For historical reasons, it is referred to as a "capcode" because in early paging devices, a code number was printed on a cap that fit on top of the pager.

Modern paging devices used in nationwide paging systems receive bilevel frequency shift keyed (FSK) encoded signals in the 930 MHz band and normally provide a single-line alphanumeric display for displaying alphanumeric and numeric messages indicating a phone number to call and other information. They also provide storage of multiple messages in memory for later review.

In the United States, there generally exists two types of nationwide paging systems. In a first type of system, a message transmitted to a subscriber is distributed to all paging transmission facilities of the nationwide paging service provider throughout the country. In turn, each facility transmits the message so that if the addressed paging device is within a coverage area of one of the transmitters, the message will be delivered to the subscriber's pager. This type of system is most convenient to the user as he or she may simply turn on their paging device in any location within the coverage area of a transmitter for such a system and receive message without any further attention. However, the message capacity of this system is not used in an efficient manner because each message is transmitted by every transmission facility in the system, but only one transmission facility will actually deliver the message to the user's pager. Therefore, the substantial majority of the message traffic of any given transmitter will normally be occupied by messages addressed to pagers that are not within the coverage area of the transmitter, thereby wasting expensive airtime. The natural result of this page transmission system is that subscriptions to this first type of nationwide paging service tend to be relatively expensive.

The second of type of nationwide paging system is one for which the same paging device may be used in any coverage area within the system, but requires the user to notify the system of his or her location so that messages directed to that user will only be sent by transmission facilities in one particular area. The "CITYLINK" paging service is an example of the service offered by this second type of nationwide paging system. This second system is referred to as a segmented system in this application. In this type of nationwide paging system, each coverage area is referred to as a service area, and generally corresponds to a major metropolitan area within the United States. The entire segmented system is composed of the collection of all service areas and the interconnecting communications links therebetween.

The user of such a system must register the presence of his or her pager in the service area in which it is located in order to received messages in that service area. A central message service center maintains a record of the service area in which the subscriber last registered his or her pager. The central message service center also receives all messages to be delivered to subscribers of the paging service. The message is then routed via interconnecting links to transmission equipment in the appropriate service area. This message is ultimately transmitted by the transmission facility only within that service area.

From this, the basic trade-off between the two types of nationwide paging systems will be appreciated. In a segmented paging system, the transmission facilities in all other service or coverage areas (save the one in which the user has registered) are not encumbered by sending messages to paging devices that are not within their service areas. This results in a significant diminution of the amount of wasted message capacity in a segmented system. This improvement in capacity usage is obtained at the price of a slight inconvenience to the subscriber, i.e., requiring the subscriber to register the presence of his or her pager in a service area as the paging device is moved out of one service area and into another. However, the great increase in utilization of capacity of the system allows service for the second type of nationwide paging system to be offered at less expensive rates than the first type of nationwide paging system.

Experience with a segmented nationwide paging system has indicated that from time to time subscribers are not mindful of the requirement that they should register their paging device when they enter a new service area. Registration is typically accomplished by calling a toll-free (800) telephone number, inputting a personal identification number (PIN), and letting the paging system know the service area in which the subscriber's paging device is now located. This information is used to update a database having an address record indicating the current service area location for each pager in the system. When an incoming message to a particular subscriber is received at the central message service center, this information is consulted and the message is forwarded to the transmission facility at the indicated service area for transmission in the appropriate service area.

When a user of a segmented nationwide paging system travels from one service area to another, she will not receive her messages if she fails to register the presence of her pager in the new service area. The registration process is cost free to the user (a toll-free call) and quick. It is therefore believed that failure to register upon moving to a new service area is often caused by the subscriber simply forgetting to register his or her pager. Often, beginning a day in a new city can be physically stressful if time zones have been crossed, and many times important business is the first order of the day.

Systems for (1) contacting "roaming" mobile radiotelephones, i.e., cellular phones assigned to a "home" cellular mobile radiotelephone (CMR) system, but moved from its system coverage area, and (2) inquiring whether the user is interested in registering as a roamer have been previously invented by a personnel of the assignee of the present invention. However, these systems identify the roamer status of the mobile radiotelephone by information (the unit's identification number) that is transmitted from the cellular telephone to a cellular system when the mobile radiotelephone registers upon entry into a new cellular system. Because paging systems are typically 1-way communications systems, there is no pager to system communication for conventional paging devices, there is no similar ability to identify the location of "roaming" pagers. Thus, there is no way to truly identify the location of a roaming receive-only pager in a segmented paging system.

Therefore, there is a need for a system that can effectively identify the location of a subscriber's paging device that has moved from one service area to another, but the user has not yet manually registered in that new service area, and thus will not receive messages. This system is desirable for both a paging service provider as a way of increasing revenue, and for a subscriber/user so that the maximum utility from a subscription to the paging system may be obtained. By obtaining updated information concerning the present service area for a pager, the segmented paging system can transmit any pages for this particular device to only the service area for which it is currently located. This supports effective operation of the transmission facilities of the segmented paging system and allows the subscriber to receive pages regardless of whether the pager is located in its local service area or a remote service area.

SUMMARY OF THE INVENTION

The present invention solves the problems of the prior art by providing a system for identifying the current service location of a "roaming" pager of a segmented paging system by communicating location data via a cellular network control channel of a cellular mobile radiotelephone (CMR) system. Telecommunications service suppliers, including a company related to the assignee of this application, Bell-South Mobility, have already installed the necessary equipment to support a nationwide communications system via CMR networks. The inventor has recognized that the CMR system is an existing communications architecture which can be adapted in a novel manner to supply either one or two-way data communications with minimal impact upon the well known voice communications offered by this network. The present invention takes advantage of this installed base of communication's equipment by using the cellular network control channel of the CMR system for data communications between a mobile switching center (MSC) and an adapted pager to supply service area data to the central message service center of the segmented paging system. Significantly, the present invention does not require any modification of the architecture of a conventional CMR system to forward transmissions from an adapted pager to update the records of the paging system.

Generally described, the present invention is a system for identifying the location of a paging device of a subscriber who has moved the paging device from a first "local" paging service area to a second paging service area that is located outside of the first paging service area. The system operates within the preferred environment of a CMR system. The CMR system typically includes at least one MSC that communicates with cellular devices within a cell via a cellular network control channel. By tracking the present service area of the paging device, the system can support the efficient delivery of a page to the paging device. The present invention offers the advantage of transmitting a page only in the current service area for a "roaming" pager rather than transmitting the page in all service areas.

A paging device or pager adapted for use with the present invention, described as a cellular paging device throughout this specification, is preferably implemented by a paging unit in combination with a cellular communications unit. The cellular paging device monitors the cellular network control channel to detect a cellular system identification signal transmitted by the MSC. At least a portion of the system identification signal uniquely identifies the particular CMR system associated with the MSC and is broadcast on an intermittent basis by the MSC. If the system identification signal does not match a unique, preassigned code for a known CMR system associated with the paging system, the paging device responds by transmitting an identification signal containing location data to the MSC via the cellular network control channel. The location data, which can be formatted as a location data message, includes: (1) a unique identification code that identifies the source of the identification signal, and (2) the system identification signal previously received by the cellular paging device. Based upon this identification code, the MSC determines that the registration signal has been transmitted by a "roaming" device associated with another CMR system known as a verification system. Accordingly, the MSC transmits the received information as a data packet to the verification system via a communications network. This verification system can be implemented by the host CMR system associated with the paging system.

In response to the data packet, the verification system, which is part of the overall pager identification system, determines that the transmitting source of the identification signal is actually a cellular paging device which has moved from its local service area to another service area, i.e., the remote service area associated with the CMR system identified by the system identification signal. Thus, the verification system communicates with the segmented paging system to update the location of the paging device. This allows the paging service of the segmented paging system to send pages to the location where the cellular paging device is actually located rather than sending pages to all possible service locations. Consequently, a message service center of the paging system can update its records regarding the location of paging devices without any need for the subscriber to manually register this new service area by placing a telephone call to the message service center.

The identification signal transmitted by the cellular paging device can be formatted to appear as a registration signal normally transmitted by a mobile radiotelephone unit when it first identifies itself to a CMR system. Because the data fields of an identification signal typically correspond to the data fields of a conventional registration signal, the unique identification code assigned to the cellular paging device can be substituted within the data field normally reserved for the mobile telephone number or MIN of a cellular device. At least a portion of the identification code includes a predetermined identifying characteristic that is associated with the verification system because it is associated with the paging system. This verification system is also called the destination system or the "host" CMR system. The MSC uses the identification code to determine whether source of the identification signal is a "local" or "roaming" cellular device. Similarly, the existing data format for a conventional registration signal can be used to support the substitution of the received system identification signal within the data field for an electronic serial number (ESN) assigned to a mobile radiotelephone. In this manner, the present invention takes advantage of the existing architecture of a conventional cellular mobile radiotelephone system to forward pager location information to a segmented paging system.

For another feature of the present invention, the paging device can monitor the cellular network control channel and, in response to detecting a cellular system identification signal that is not associated with its verification CMR system, issue a prompt or alert to the subscriber. This prompt serves to advise the subscriber that the paging device is now operating outside of its local paging area, thereby reminding the subscriber to call the paging service and to register the new operating location. The subscriber can register the new operating location for the paging device by calling a toll-free number and entering the paging device number, personal identification number (PIN), and the area code of the new location.

In view of the foregoing, it is an object and advantage of the present invention to identify the present service area of a "roaming" pager within a segmented paging system, thereby allowing the paging system to efficiently use transmission facilities by transmitting a page for that pager only within the identified service area.

It is another object and advantage of the present invention to provide a system for communicating to a segmented paging system the present service area of a pager to a paging system via a cellular network control channel of a CMR system.

It is another object and advantage of the present invention to adapt the existing equipment of a CMR system to implement a system for communicating to a segmented paging system the location of a pager via a cellular network control channel of the CMR system to a segmented paging system.

These and other objects, features, and advantages of the present invention may be more clearly understood and appreciated from a review of the following detailed description and by reference to the appended drawings and claims.

BRIEF DESCRIPTION OF THE DRAWINGS

FIGS. 4A, 4B, and 4C collectively described as FIG. 4, are logical flow diagrams illustrating the preferred steps for a method of communicating a location data message via a CMR system to a paging system.

DETAILED DESCRIPTION

Figure 1:
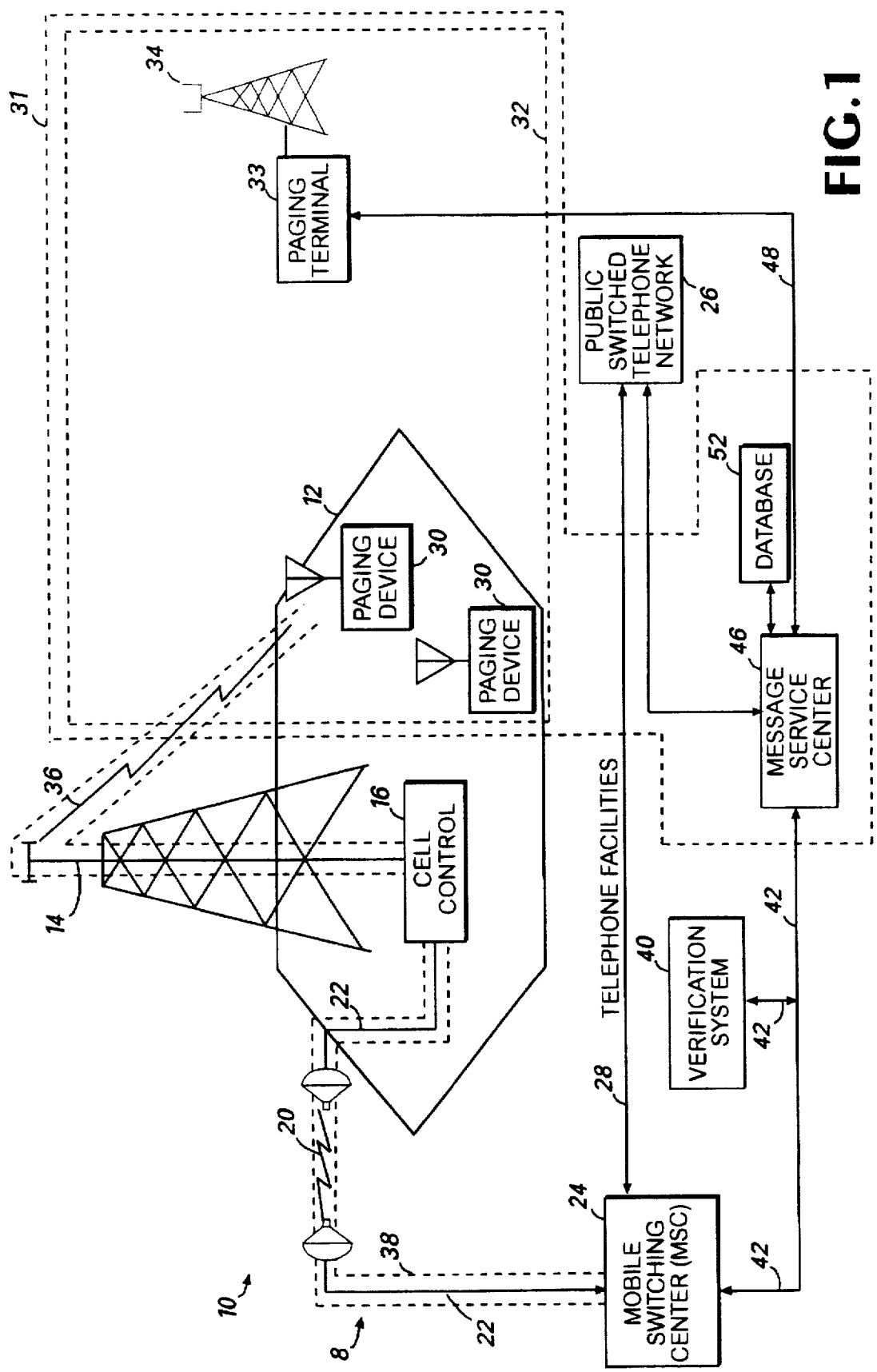
FIG. 1 is a block diagram of the preferred embodiment of the present invention in its preferred operating environment of a CMR system.

The present invention supports the efficient transmission of a paging message to a roaming paging device that has moved from its local paging service area to another paging service area that is located outside of the local paging service area. The system operates within the preferred environment of a segmented paging system and a cellular mobile radiotelephone (CMR) system. In particular, the present invention takes advantage of the existing architecture of a CMR system to forward location information to a paging system from a pager having cellular communications capability.

A communications path between the CMR system and pagers adapted for use with the present invention is implemented by a cellular network control channel, which is also referred to as an overhead channel. A "cellular pager", also described as a cellular paging device, operates within a cell of the CMR system and can send a location data message via the cellular network control channel to the CMR system. In turn, the CMR system can forward the location data message to the segmented paging system, which uses the location data to update its records regarding the present service area for this pager. This allows the segmented paging system to transmit a page to the cellular pager in the present service area for the device rather than all service areas supported by the paging system.

The present invention encompasses the combined use of both a conventional paging system and a CMR system. Prior to describing the detailed operation of the pager identification system of the present invention, it will be useful to review the operation of a typical cellular mobile radiotelephone (CMR) system. A CMR system, which is connected to the extensive public switched telephone network (PSTN), permits communications between a mobile radiotelephone user and anyone with a conventional telephone (or another radiotelephone). A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As an active mobile radiotelephone, i.e., a radiotelephone receiving a call or originating a call, moves from one cell into an adjacent cell, control circuitry associated with the cells detects that the signal strength of the mobile radiotelephone in the just-entered cell is stronger, and communications with the mobile radiotelephone are "handed-off" to the just-entered cell. Thus, a CMR system can supply two-way communications for an array of cells, thereby supplying communications for a much wider area than conventional two-way radios.

A CMR system typically uses a pair of radio frequencies for each radio channel and each cell. Each cell typically includes at least one signaling channel, also referred to as a cellular network control channel or an access channel, and several voice channels. The cellular network control channel is selected or dedicated to receive requests for service from mobiles and portables, to page selected mobiles or portables, and to instruct the mobiles or portables to tune to a predetermined voice channel where a conversation may take place. Accordingly, the cellular network control channel is normally responsible for receiving and transmitting data to control the communication actions of the mobile and portable radiotelephones.

The cellular network control channel normally comprises a forward control channel (FOCC) for communications from a mobile switching center (MSC) to a mobile radiotelephone unit and a reverse control channel (RECC) for communications from the mobile radiotelephone unit to the MSC. The FOCC supplies a multiplexed data stream of message data words, a busy idle signal, and busy idle bits. The busy idle bits are useful for supplying an indication to monitoring mobile radiotelephones about the current status of the RECC. If the RECC is in use by a mobile radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a mobile radiotelephone normally transmits on the control channel during the window of opportunity that is presented by a transition from the busy state to the idle state. In particular, the busy idle bit supplies an instantaneous view of the signaling activity on the control channel, and the conventional mobile radiotelephone is responsive to this instant snapshot of control channel activity.

The data message and radio channel specifications for U.S. cellular mobile radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue. N.W., Washington, D.C., USA 20006.

It is known that when a cellular mobile radiotelephone originates a call, it transmits a series of data messages to the serving cell. These messages, commonly referred to as Call Origination, are defined by EIA/TIA-553. These data messages always contain the low order seven digits of the unit's telephone number, known as the Mobile Identification Number (MIN), the unit's Station Class Mark (SCM), which identifies functional characteristics of the unit, and the Called Address, or dialed telephone number. Cellular system operators typically also require additional data words to be transmitted that contain the MIN2, which is the high order three digits or NPA of the cellular unit's telephone number, and the Electronic Serial Number (ESN). The MIN is assigned to a particular radio telephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like.

These messages are provided first to the cell, and then through a data link to a mobile telephone switching center, otherwise described as a mobile switching center. The MSC, also known as a "switch," makes voice connections between mobile radiotelephones and other telecommunications networks. At the MSC, a determination is typically made whether the radiotelephone is an authorized user or subscriber by looking up the unit's telephone number, serial number, and other information supplied by the radiotelephone to see if there is an entry in the MSC's database corresponding to that particular telephone. An optional function of an MSC is to validate that the ESN and MIN received as part of a "Call Origination" message are valid. If the MIN is valid and the radiotelephone is identified as a subscriber within the given cellular system, i.e., a "home" unit, the received ESN is compared to the MSC's database ESN entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as "Autonomous Registration" by supplying a data packet similar to that of a Call Origination. The Autonomous Registration signal, also referred to as a registration or identification signal, typically comprises data fields for at least a mobile telephone number, i.e., the MIN, and an ESN. The original design attempt of Autonomous Registration was to improve the efficiency of potential future call deliveries by keeping the MSC informed of the approximate whereabouts of each individual radiotelephone unit, and to reduce paging channel load by lessening the need to page all cells to find a particular cellular unit. When the MSC is thus informed, it can later "page" or attempt to ring the cellular unit only in the cell or area that it was last known to be in. Additional cells would be paged only if the initial page did not locate the particular radiotelephone. Thus, Autonomous Registration is simply a set of messages periodically and autonomously sent from the mobile radiotelephone to the serving cell at an interval specified in data parameters previously received from the cell by the cellular unit.

A subscriber using or attempting to use his or her mobile radiotelephone in a service area outside the home service area is said to be "roaming," and he or she (and the associated mobile radiotelephone unit) is commonly referred to as a "roamer." For example, if a subscriber enters the service area of another CMR system service provider and powers on the radiotelephone, the radiotelephone will subsequently receive a message via the control channel of the particular cell in which the telephone then resides. This message will include a request that the subscriber register for operation in the particular cellular system. In response, the mobile telephone number, the serial number, and the station class mark for the radiotelephone unit can be transmitted as identifying information back to the cell site. The cell forwards this information to a mobile switching center, which quickly ascertains whether the radiotelephone unit is a customer of the local cellular service provider or the customer of another cellular system.

If the radiotelephone unit is a customer of another cellular network, the mobile switching center will send a message packet to the verification system for the particular telephone unit. This message indicates that the particular radio telephone unit has registered in another cellular system and requests information about the validity of the number and account information for the radio telephone unit. The verification system responds by transmitting a responsive packet containing the requested information. If valid, the mobile switching center at the foreign cellular system will then add the roamer to its list of registered users and the verification cellular system will add the subscriber associated with the radio telephone unit to a list of roamers that are out of the service area and registered in another area.

When this same radiotelephone unit registers with yet another system, the database at the mobile switching center for the home system will observe that the unit has moved again and will update its list of where the roaming unit has most recently registered in a database system. In addition, it will send a message to the first foreign system informing it that the roaming unit has now moved on and registered in another system, and that the first foreign system should delete the particular unit from its list of registered roamers. In this manner, the databases at the various mobile switching centers are not cluttered with data identifying previously registered roamers as valid accounts to whom service should be provided, when these roamers may have long since left the area of service.

Conventional radiotelephones generally offer both voice and data communications capabilities and, accordingly, the radiotelephone service is generally supplied at a cost that is commensurate with the combined voice and data services. Nevertheless, this combination of both voice and data communications may exceed a user's requirement for communicating by only voice or data. In addition, real-time voice or data communications is not always desirable by a user who wishes only to receive a message without having a current activity disturbed. Similar to two-way radios, the frequency spectrum for the CMR system radio channels, particularly voice channels, is a finite resource. It will be appreciated that it is particularly desirable to conserve use of the voice channels of a CMR system to support the provision of mobile telephone conversation services.

Referring now to the drawings, in which like numerals indicate like elements throughout the various figures, FIG. 1 illustrates a pager identification system 10 in the preferred operating environment of a cellular mobile radiotelephone (CMR) system 8 and a segmented paging system 31. By operating within the environment of the CMR system 8, which is well adapted to facilitate portable or mobile communications, the pager identification system 10 takes advantage of this existing wide area cellular communications network to forward a message identifying the present service area of an adapted pager to the segmented paging system 31. Although the present invention is intended for primary use with segmented paging systems, it will be understood that the inventive concept can be readily extended to other types of paging systems.

The pagers of the segmented paging system 31, which are referred to in this specification as cellular pagers or cellular paging devices, are adapted for use with the present invention to include a data-only cellular communications capability. This cellular communications capability supports efficient paging operations by the segmented paging system 31 because the service area of a "roaming" pager can be updated in response to the location data messages. A cellular pager, also described as a cellular paging device, operating outside of its assigned service area can supply pager location information to the segmented paging system 31 by sending an identification signal having a location data message in a data-only format to a CMR system 8 having a cell array within the new paging service area. In turn, the CMR system can forward the location data to the segmented paging system via a communications network. In this manner, the present service area of the cellular pager is identified and the segmented paging system can deliver future pages to the roaming cellular pager by transmitting the page only within the present service area of this pager unit.

A typical CMR system, such as the CMR system 8, includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the mobile switching center (MSC) 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

It is well known to those skilled in the art that the conventional CMR system comprises at least one mobile telephone switch coupled to an appropriate array of more or less identically equipped cell sites 12. The MSC 24 normally couples voice-based telephone conversations involving the users of mobile radiotelephones operating in the cell 12 to the public switched telephone network (PSTN) 26 through telephone facilities 28. However, the MSC 24 also conducts data communications with the mobile radiotelephones to support communications control operations. It will be appreciated that a typical CMR system includes numerous MSCs and cell arrays.

The MSC 24 receives data messages via a cellular network control channel 38 formed by the combination of the data link 22 and a cellular communications link 36 between the broadcast antenna 14 and each device capable of cellular communications within the cell 12. This combination of communications links is collectively referred to as the control channel or the overhead channel. It is well known that a cellular network control channel for a conventional CMR system comprises two RF channels that are commonly described as a forward control channel (FOCC) and a reverse control channel (RECC). The FOCC is used for communications initiated by the MSC to a mobile radiotelephone unit. In contrast, the RECC is used for communications from a mobile radiotelephone unit to a MSC 24.

In addition to the cellular communications environment set forth by the CMR system 8, FIG. 1 also illustrates a conventional segmented nationwide paging system, the segmented paging system 31. The segmented paging system 31 includes at least one service area, such as the service area 32 having one or more service area terminals 33 and antennas 34, and a message service center 46 having a computer database 52. The segmented paging system 31 is connected to the PSTN 26 to receive incoming pages from parties desiring to send messages to subscribers of the paging service. These incoming paging messages are supplied to the message service center 46 and forwarded via a communications link 48. Communications from a service area terminal 33 to individual cellular pagers 30 occur via RF transmissions output by the antenna 34.

The segmented paging system 31 can be implemented to support the presently available "CITYLINK" paging service offered by a subsidiary of the assignee for the present invention. As noted hereinabove, the existing "CITYLINK" paging service operates in the 931 MHz-band and uses two-level frequency shift keyed (FSK) modulation to encode paging data.

For purposes of a simplified presentation. FIG. 1 illustrates only a single service area of a segmented paging system. The service area 32 of FIG. 1 is representative of a conventional service area of a segmented paging system and overlaps with the cell 12 of the CMR system 8. It will be understood that the segmented paging system 31 can include numerous service areas, as well as a multitude of service area terminals and antennas. Indeed, the preferred pager identification system 10 can be extended for use with a nationwide segmented paging system having a plurality of service areas, such as the "CITYLINK" paging service.

The computer database 52 of the message service center 46 preferably includes a subscriber database that maintains records of subscribers of the paging service, including the address codes for the subscribers' pagers and an indication of the particular service area in which the pagers are currently registered. Callers desiring to page a subscriber of the paging service can use the telephone facilities 28 and direct the page to the message segmented paging system 31 via the PSTN 26. Paging messages are typically provided by a modem or other device via the PSTN 26 by dialing a toll-free number that sends messages to the message service center 46. Alternatively, the traditional function of digital pager can be implemented by connecting to specially adapted equipment at the message service center 46, such as dual tone multi-frequency (DTMF) detectors. The DTMF detectors allow the caller to input a telephone number to be called or other numeric message via operation of a touch tone keypad. Also, digitized voice segments may be stored for voice paging functions.

Communication between the message service center 46 and transmission facilities at various service areas, such as the service area 32, is preferably accomplished via the communications link 48, such as an up-link with a communications satellite (not shown). The service area 32 likewise receives messages from the message service center 46 on a down-link from the communications satellite. While use of satellite communications is preferred, the communications link 48 can be implemented by terrestrial microwave, fiber optics, and any other form of data transmission facility to establish communications between the message service center 46 and the various service area facilities.

The service area 32 has a transmission facility, generally indicated at the service area terminal 33, which is controlled by a computer that receives and queues paging messages, and controls the transmission thereof. While shown as a single transmission facility in the drawings, those skilled in the art will understand that a typical metropolitan area transmission facility for a segmented paging system can include multiple transmitters.

One or more cellular paging devices can operate with the array cell of the CMR system 8. Each cellular paging device 30 is capable of receiving conventional pages, also described as paging messages, from the segmented paging system 31. Similar to a conventional pager, the preferred cellular pager 30 can include a multi-line LCD alphanumeric display for displaying messages carried by the pages and an alert mechanism to signal the reception of a page. The addressability of the cellular pager 30 by the segmented paging system 31 is determined by a unique identifier or "capcode" stored within memory of the device. Each cellular paging device 30 also can transmit location data messages via the cellular network control channel 38 to the CMR system 8. Moreover, each cellular paging device 30 is capable of monitoring the cellular network control channel 38 to receive information and commands from the CMR system 8.

Similar to a conventional mobile radiotelephone unit, the cellular pager 30 can use the RECC of the cellular network control channel 38 to send data to the MSC 24. Likewise, the cellular pager 30 can receive messages and control signals from the MSC 24 via the FOCC of the cellular network control channel. This use of the existing architecture of a cellular network control channel is advantageous because it does not degrade the use of the voice channels of a CMR system and permits conservation of the valuable frequency spectrum dedicated to these voice channels. The operation of the cellular paging device 30 will be described in more detail below with respect to FIGS. 2 and 3.

Focusing on cellular communications between the cellular paging device 30 and the CMR system 8, the MSC 24 can receive data-type messages, including identification signals having location data messages, from each of the cellular paging devices 30 within the coverage areas of the array of cells for the CMR system 8. Each location data message contains a unique identification code that identifies the corresponding source of the cellular transmission and a system identification code identifying the present CMR system for which the cellular paging device 30 can communicate. The vendor of the cellular paging device 30 typically assigns the identification code, which serves as a unique identifier for the cellular paging device and is maintained within device memory. In contrast, the system identification code is obtained by the cellular paging device 30 in response to receiving a system identification signal via the cellular network control channel of the CMR system 8. It will be appreciated that the system identification code represents at least a portion of the system identification signal transmitted by the CMR system and received by the cellular paging device 30.

The cellular paging device 30 typically obtains the system identification signal from the CMR system 8 by monitoring the cellular network control channel 38 in response to powering the device. The cellular paging device 30 is programmed to compare the received system identification signal, specifically the system identification code, with a preassigned code maintained by the cellular paging device 30. For the preferred embodiment, the verification system 40 is associated with the segmented paging system 31 and is identified by at least a portion of the preassigned code, which is stored within memory of the cellular paging device 30. Thus, this preassigned code identifies the "home" CMR system associated with the paging system 31, namely the verification system 40. It will be appreciated that the preassigned code preferably uniquely identifies a CMR system that services the cellular communications needs of the segmented paging system 31.

In general, the received system identification signal will not match the stored system identification code associated with this home CMR system if the subscriber has moved from the cell array of the home CMR system to a cell site for another CMR system. If the received system identification signal does not match the stored system identification code, then the cellular paging device 30 can transmit an identification signal including location data to the MSC 24 via the cellular network control channel 38. This comparison is preferably conducted by comparing the system identification code of the received system identification signal to the stored system identification code maintained by the cellular paging device 30. This location data includes an identification code identifying the source of the transmission, i.e., the cellular paging device, and the received system identification code.

Although the location data contains a selected set of data rather than the parameters normally contained in a conventional radiotelephone registration signal, the MSC 24 can operate upon the identification signal as if it were transmitted by a conventional mobile radiotelephone operating within the cell. Specifically, the MSC 24 treats the identification signal as a signal output by a mobile radiotelephone unit because the messages are formatted to appear as a conventional registration signal.

The MSC 24, in response to a predetermined identifying characteristic supplied by the identification code, can forward the location data to a verification system 40 via a communications network 42. This predetermined identifying characteristic is typically defined by at least a portion of the MIN assigned to the cellular paging device 30. The verification system 40, which can be implemented as an MSC, is programmed to recognize that location data contains data identifying the present service area of a cellular paging device 30. Consequently, the verification system 40 responds to the location data by sending this data to the segmented paging system 31. Specifically, the verification system 40 preferably transmits the location data to the message service center 46 via the communications network 42. Based on the unique identification code and the received system identification code supplied by the location data, the message service center 46 can update its records defining the operating service areas for the cellular paging devices 30 of the segmented paging system 31. This allows the message service center 46 to route a page to the appropriate service area terminal 33 for the transmission in the service area 32 corresponding to the present location of the cellular paging device 30.

Those skilled in the art will appreciate that preferred embodiment of the present invention takes advantage of a convention defined by the cellular communications industry, specifically the assignment of a unique system identification code to a CMR system. Because a geographical coverage area for a particular CMR system can be identified based on its system identification code, the geographical area represented by the system identification codes can be mapped to the service areas of the segmented paging system. This mapping of CMR system coverage areas to paging system service areas supports the identification of the present service area for a roaming cellular paging device. The message service center 46 of the segmented paging system 31 can maintain this map within a memory storage device. The stored map can be used to support the updating of the database that lists the cellular paging devices 30 and their respective service areas.

For proper reception of pages, as well as transmission of location data messages and monitoring of the cellular network control channel, the cellular pager 30 should reside or operate in a service area for the segmented paging system 31 that overlaps with a cell of the CMR system 8.

The cellular system 8 is preferably implemented as an AMPS or a DAMPS cellular system. However, it will be appreciated that the CMR system 8 also can be compatible with alternative cellular systems implementing a control channel for mobile-to-cell communications, including: DCS 1800, GSM, IS 95-CDMA, JTACS, TACS, ETACS, RC 2000, NMT 450, ESMR, CT-2, WACS, NMT 900, or other similar wireless systems. The MSC 24 can be implemented by a conventional switching device that is compatible with the corresponding CMR system.

The verification system 40 can be implemented by an MSC or by an adapted computer, such as the computer of a service circuit node (SCN). Certain manufacturers of switches, such as the MSC 24, also offer devices for implementing communications with the verification system 40, including the Motorola EMX switch and other vendor proprietary switches. Switch manufacturers include: AT&T Network Systems, Whippany, New Jersey; Ericsson Radio Systems, Richardson, Texas; Hughes Network Systems, Germantown, Md.; and Motorola, Schaumburg, Ill.

The communications network 42, which is connected to the MSC 24, the verification system 40, and the segmented paging system 31, is typically implemented by a conventional telephone facility, a dedicated data link, or by a wireless communications link. The preferred communications network 42 conforms to the standards defined by the EIA/TIA Interim Standard 41 (IS-41 standard) and is commonly referred to as an IS-41 network. The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber.

Although only a single MSC is shown in FIG. 1, it will be appreciated that the communications network 42 can be connected to numerous cellular systems. In particular, the communications network 42 can be connected to multiple CMR systems, each having one or more MSCs, to support a nationwide cellular mobile radiotelephone communications network.

Figure 2:
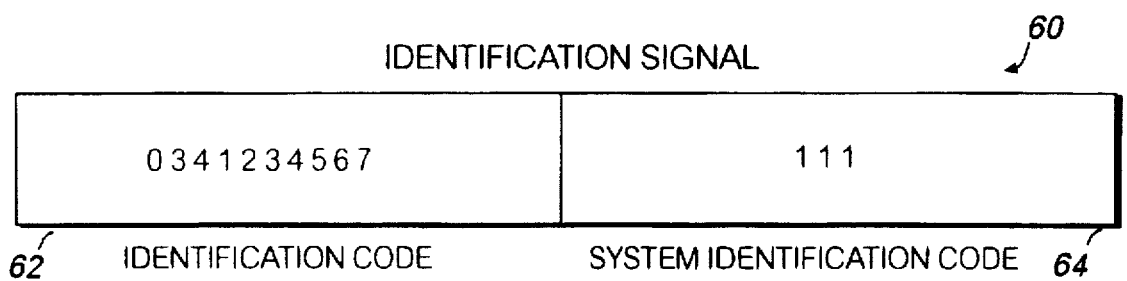
FIG. 2 is a diagram that illustrates the preferred data structure for the fields of a location data message communicated as an identification signal by the present invention.

In response to the transmission of an identification signal by a cellular paging device 30, the MSC 24 typically makes a determination whether the transmission source is an authorized user or subscriber of the services offered by the CMR system 8 or another cellular system. As shown in FIG. 2 and described below with respect to the preferred format of the identification signal, the identification signal includes a location data message containing certain data which identifies the cellular paging device 30 as a radiotelephone unit which normally operates within another cellular system. Based upon this information, the MSC 24 can determine that the cellular paging device 30 is a "roamer" that subscribes to a cellular communications service offered by a cellular system other than the CMR system 8.

In particular, the MSC 24 maintains a list or database containing records that map a predetermined identifying characteristic of the identification code to a particular cellular system. By checking this database, the MSC 24 can determine whether the source of the identification signal, the cellular paging device 30, is either a subscriber or a roamer. Consequently, for roaming cellular paging devices, it will be understood that the MSC 24 interprets the identification signal as a transmission from a roaming mobile cellular radiotelephone operating within the CMR system 8. Specifically, based upon a portion of the identification code that is uniquely associated with the verification system 40, the MSC 24 locates an entry in its database that commands the switch to send all messages containing such a characteristic to the verification system 40. Accordingly, the MSC 24 thereafter forwards the location data message via the communications network 42 to the verification system 40.

In recognition that the cellular paging device 30 is actually associated with a remote cellular system, the MSC 24 forwards the location data message to the verification system 40 via the first communications network 42. The verification system 40, which represents another CMR system identified by the identification signal, does not support telephone conversations, but rather is dedicated to forwarding the location data to the segmented paging system 31. The verification system 40 processes the location data message and compares the identification code in the location data to a list of such characteristics in its database. This database preferably contains an entry for an identification code of each of the known cellular paging devices 30 and corresponding data that identifies the associated device as a valid cellular source. If the verification system determines that the roamer identified by the location data message is a valid or authorized user, then its sends to the MSC 24 a validation message. In response, the MSC 24 adds the cellular paging device 30 as a registered mobile radiotelephone to a database of registered roamers at the MSC 24.

The verification system 40 can subsequently transmit a command that instructs the MSC 24 to delete the cellular pager 30 from its list of registered roamers. This command is typically implemented as a "REG CANCL" signal for a conventional CMR system. It will be understood that the MSC 24 would normally receive this command when a roaming mobile radiotelephone has moved to another CMR system and subsequently registered for operation on that other cellular system. By deleting the registration entry from the MSC database, the MSC 24 is not required to track the cellular paging device 30 after transferring the location data of the identification signal to the verification system 40.

It will be appreciated that the MSC 24 also can clear its database of a registration entry upon the expiration of a certain time interval. For example, the verification system 40 can respond to the location data message by transmitting a command which confirms that the roamer is a valid user and instructs the MSC 24 to delete the registration entry upon the expiration of a certain time interval. As a separate option, the MSC 24 can automatically delete a registration entry from its database upon expiration of a certain time period without any instruction from the verification system 40.

FIG. 2 is a table that shows the preferred format for the identification signal transmitted by the cellular paging device 30. Referring now to FIGS. 1 and 2, the identification signal is transmitted by the cellular paging device 30 in the event that a preassigned code for that device does not match at least a portion of the system identification signal carried by the cellular network control channel 38. The preferred identification signal includes a data record 60 for a location data message containing (1) a data field 62 for an identification code which uniquely identifies the cellular paging device 30 that initiates the transmission of the location data message, and (2) a data field 64 for the system identification code received from the MSC 24. To take advantage of the existing architecture of a CMR system 8, the format for the location data message is preferably identical to the message format (or data record) for a registration signal that is transmitted by a cellular radiotelephone when it first identifies itself to a CMR system, such as the CMR system 8.

Consequently, it will be understood that the cellular paging device 30 can attempt to "register" with the MSC 24 by sending the identification signal via the cellular network control channel 38. The format associated with a conventional registration signal is preferably used for the identification signal output by the cellular paging device 30. In this way, a location data message carried by the identification signal appears to contain a valid mobile telephone number and an ESN. Although it is not intended for the cellular paging device 30 to place a conventional voiced-based cellular telephone call, the cellular paging device 30 nevertheless registers for operation with the MSC 24, thereby enabling the communication of the location data message via the CMR system 8.

As shown in the data record 60 in FIG. 2, the standard message format for a conventional registration signal has been adapted by the location data message to permit the identification of the particular transmitting cellular paging device 30 and the communication of the system identification code for the CMR system servicing the area of operation for the cellular pager. In particular, the data field 62 for the identification code corresponds to at least a portion of a mobile telephone number or MIN assigned to the cellular paging device 30. Thus, the identification code is substituted within the data field normally reserved for the MIN in an identification signal. This identification code can belong to a set of unassigned mobile telephone numbers. Alternatively, the identification code assigned to each cellular paging device 30 can be a conventional telephone number or a set of 10 digits. The identification code permits the identification of the source of the data by uniquely identifying the cellular paging device 30. At least a portion of the identification code also supplies information used by the MSC 24 to recognize that the source of the identification signal is associated with the another CMR system, i.e., the verification system 40.

Furthermore, the data field 64 in the location data message for the received system identification code corresponds to a location within the data record of a conventional registration signal for the ESN. It is well known that the ESN is 32 bits long and includes 8 bits for a manufacturer code. For CMR systems that do not review or screen ESNs based upon the manufacturer code segment, it is possible to manipulate the data field normally filled by an ESN to supply a location data message having a data field 64 containing up to 32 bits of selected data. However, if the cellular system uses the manufacturer code segment of the ESN, the selected data within the data field 64 comprises a maximum length defined by the remaining 24 bits of the ESN. For most applications, it will not be necessary to manipulate the manufacturer's code segment of the ESN because a location data message having 24 bits of selected data (and, as required, 8 bits of the manufacturer code segment for a conventional ESN) should be sufficient to define the system identification code.

It will be appreciated that the identification signal can also carry other types of data, including data that identifies the type of cellular communications device that is the source of the identification signal.

Although adapting certain predefined data fields of a conventional registration signal is the preferred method for forwarding selected data in a location data message to the MSC 24, another message protocol also can be used to send desired information from the cellular paging device 30 to the MSC 34 via the control channel 38. Specifically, EIA/TIA-553 defines an extended protocol message that can be adapted to contain the above-described data fields for the identifier code and the system identification code. For this type of message transfer, the location data message is formatted to represent an extended protocol message in accordance with EIA/TIA-553. This extended protocol extends the signaling capabilities of the interface between the MSC and mobile cellular devices to allow new features and operational capabilities for present and future cellular systems.

As defined by EIA/TIA-533, the extended protocol message for the RECC includes a message header and at least one message data word (up to N message data words). The message header consists of two words, a header word A and a header word B. The header word A includes a format having the following fields: field F1 (2 bits set to the binary value 11), which indicates the start of the header; a reserved field RSVD (2 bits set to the binary value 00); a message class field T (1 bit set to the binary value 1); an S field (1 bit set to the binary value 0), which indicates whether the cellular device should send its serial number when it accesses the system; an E field (1 bit set to the binary value 1), which indicates whether the cellular device should send MIN 1 and MIN 2; an extended protocol indicator ER field (1 bit); an SCM field (4 bits); an MIN field (24 bits); and a cyclic redundancy code P (12 bits). The header word B includes the following fields: field F2 (2 bits set to the binary value 10), which indicates the start of the second header word; a reserved field RSVD (2 bits set to the binary value 00); a message length indicator MSL field (5 bits); a message type indicator MST field (8 bits); an LT field (1 bit), which indicates whether the next access by the cellular device should be the last access try; an extended protocol capability indicator EP field (1 bit set to a binary value 1); a reserved field RSVD (7 bits set to a binary value 0 ... 0); an MIN 2 field (10 bits); and a cyclic redundancy code P (12 bits). The message data word includes the following fields: field F3 (2 bits set to the binary value 01), which designates the first to last N-1 message data words, or field F4 (2 bits set to the binary value 00), which designates the last message data word; the message data (34 bits); and a cyclic redundancy code P (12 bits).

A mobile switching center or MSC is typically programmed or otherwise adapted to conduct a predetermined operation upon an extended protocol message or to implement a certain action in response to the reception of a extended protocol message. To take advantage of this type of message protocol, the MSC 24 is preferably programmed to forward to the verification system 40 each location data message that is formatted as an extended protocol message. This communication of the extended protocol message does not require the MSC 24 or the verification system 40 to be implemented as an IS-41-compatible communications system. Thus, the communications network 42 for this embodiment can be implemented as a dedicated data link or a wireless communications link rather than as an IS-41-compatible communications network.

Figure 3:
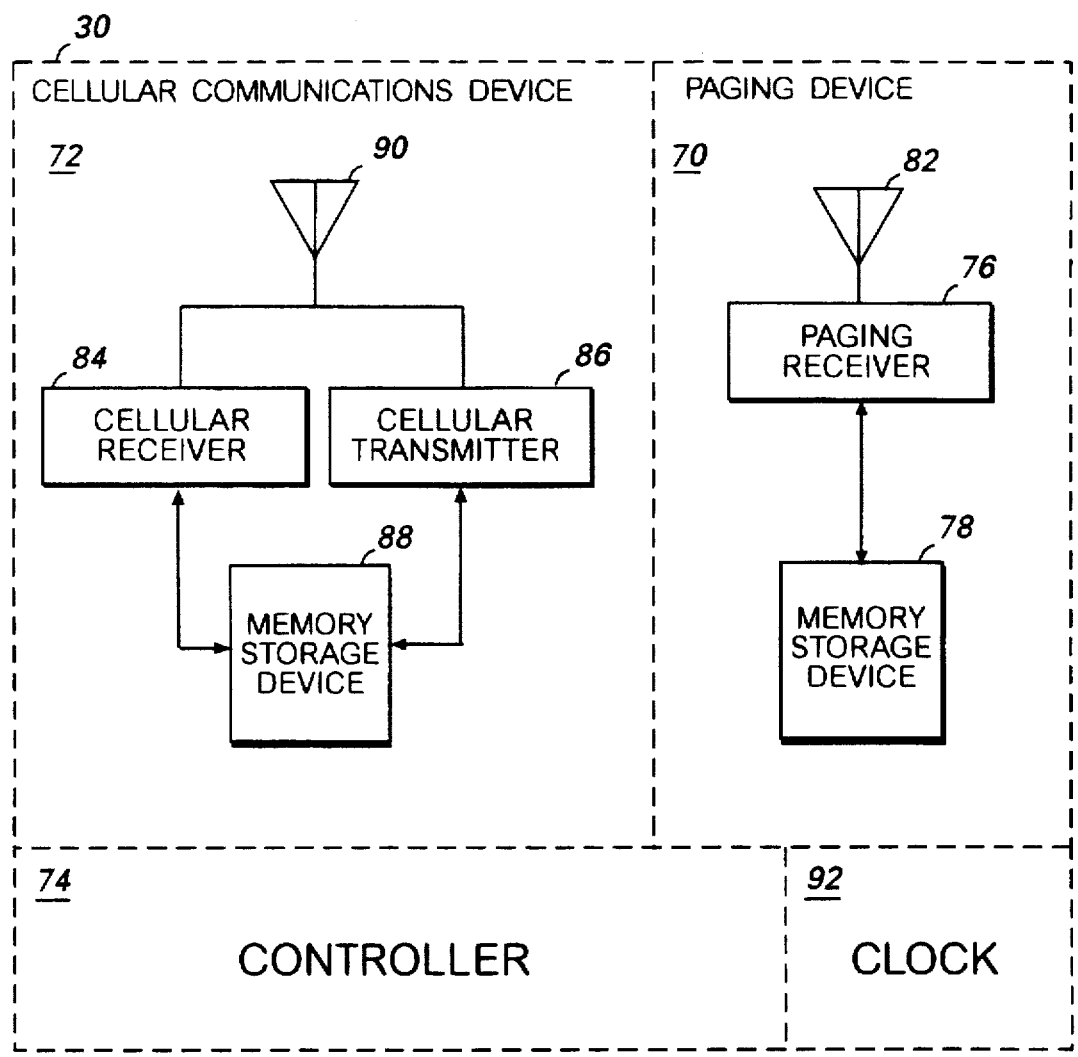
FIG. 3 is a block diagram of the preferred cellular paging device of the present invention.

FIG. 3 is a block diagram that illustrates the primary components of the cellular paging device 30. As shown in FIG. 3, the cellular paging device 30 includes a paging device 70, a cellular communications device 72, and a controller 74 for controlling the operations of the paging device 70 and the cellular communications device 72. For the preferred implementation of the cellular paging device 30, the paging device 70 and the cellular communications device 72 are packaged within the same housing to facilitate convenient use of the cellular pager 30 by the typical paging service subscriber. The inventor envisions that the cellular paging device 30 will be portable and housed within a miniature package similar to present paging devices and mobile radiotelephones. A battery (not shown) is a preferred power source for the cellular pager 30 in view of the intended portable use of the device.

The paging device 70 includes a paging receiver 76 and an antenna 82 for receiving paging message from a paging terminal 33 of the segmented paging system 31. The paging data of a page received by the paging receiver 76 can be stored within a memory storage device 78. In response to the page, the paging receiver 76 outputs an alert to the user to advise of the reception of the paging message and thereafter supplies the data to the user via an output device 80. The output device 80 presents the paging data in a known manner, typically via alphanumeric data displayed on a display and/or an audible message via a speaker (not shown). The controller 74 can control the operations of the paging device 70.

To communicate with the MSC 24 via the cellular network control channel 38, the cellular communications device 72 includes a cellular receiver 84 and a cellular transmitter 86. The cellular receiver 84 and the cellular transmitter 86 can share an antenna, such as the antenna 90 shown in FIG. 3, or can use separate antennas. The cellular receiver 84 can be implemented as the receiver for a conventional mobile radiotelephone unit. However, the preferred cellular receiver 84 operates to receive information primarily via the data radio channels rather than the voice radio channels of the CMR system 8. Specifically, the preferred embodiment is capable of only data communications via the cellular network control channel 38. A memory storage device 88 can store (1) the preassigned code for the device, i.e., a system identification code representing the identity of the verification system or "host" system associated with the segmented paging system 31, and (2) any data received by the cellular receiver 84. For example, the memory storage device 88 can store the system identification code transmitted by the MSC 24 via the cellular network control channel 38 and received by the cellular receiver 84. The controller 74 controls the operations of the cellular communications device 72.

In response to certain transmissions by the MSC 24 over the cellular network control channel 38, the cellular receiver 84 receives a system identification signal carrying a system identification code for the CMR system associated with the MSC. The controller 74 then compares the received system identification code to the stored preassigned code, i.e., the system identification code maintained by the cellular paging device 30. In the event that the system identification code maintained by the cellular paging device 30 does not match the received system identification code, the controller 74 prepares a location data message in anticipation of the cellular communications device transmitting an identification signal. The controller 74 prepares the location data message by placing the identification code for the cellular paging device and the received system identification code within the respective data fields 62 and 64 (FIG. 2). In response to a transmission command from the controller 74, the cellular transmitter 86 transmits the location data message as an identification signal via the cellular network control channel 38.

To properly communicate with the MSC 24, the transmission of identification signals by the cellular transmitter 86 are compatible with conventional cellular standards and protocols for the transfer of data signals (rather than voice signals) over a cellular network control channel. Accordingly, the cellular transmitter 86 can be implemented as a transmitter for a conventional radiotelephone unit capable of data communications, with the exception that this transmitter is adapted to accept the identifier code and the received system identification code. Indeed, by transmitting the location data message via the cellular network control channel 38, the cellular paging device 30 conducts an operation that is similar to an Autonomous Registration operation performed by a standard mobile radiotelephone.

It will be understood that the cellular transmitter 86 only requires the capability to transmit on the data channels of a CMR system, such as the cellular network control channel 38, because the paging identification system 10 does not use the voice channels for forwarding location data messages via the cellular network to the segmented paging system 31. Accordingly, the cellular transmitter 86 should draw less power than a conventional radiotelephone that operates on both the voice and data channels of the a cellular network control channel. In addition, the cellular transmitter 86 typically draws power only during data transmission intervals, thereby conserving the preferred power source, a battery. A typical transmission of a location data message occurs as a burst of data in the form of a data packet, thereby further reducing power consumption. Power conservation is significant to the convenient use of the cellular paging device 30 because it is primarily intended for use by a mobile subscriber who does not have regular access to another type of power source. It will be appreciated that an alternative power source for the cellular transmitter 86 is a capacitor capable of storing sufficient energy to transmit the data bursts.

It is well known that the FOCC of a cellular network control channel carries a stream of busy idle bits to indicate the status of the RECC of the cellular network control channel. The RECC is busy if the busy idle bit is set to a binary one value. To minimize the impact of transmissions by one or more cellular paging device 30 within the cell 12 upon the normal control signal traffic on the cellular network control channel 38, the cellular transmitter 86 can be programmed to transmit the location data message during those periods when this data channel is available or is likely to be available. For example, in the event that the system identification code maintained by the cellular paging device 30 does not match the system identification code received via the cellular network control channel, the transmission of the identification signal by cellular transmitter 86 can be delayed until RECC is available or likely to be available.

For this location data message queuing operation, the cellular receiver 84 monitors the FOCC of the control channel 38 to enable a determination of the amount of activity on the RECC for the monitored cell. By monitoring the FOCC and counting the number of busy idle bits set to the binary one value for a predetermined time period, the cellular paging device 30 can determine the level of communications activity of the CMR system during that time period. If the level of communications activity falls below a certain threshold associated with light or no activity on the control channel, then the controller 74 supplies the data packet to the cellular transmitter 86. In response, the cellular transmitter 86 initiates a location data message transmission to the MSC 24 via the RECC of the control channel 38. This message queuing operation minimizes the impact of transmission by one or more of the cellular paging devices 30 within the cell 12 upon the normal control signals supplied via the control channel 38 to conventional mobile radiotelephone units operating within the cell.

Specifically, the cellular receiver 84 monitors the busy idle bits carried by the FOCC of the control channel 38 for sequential, predetermined time periods. In response to reception of the busy idle status signal, the cellular paging device 30 calculates and stores (1) a running average of the highest count of busy idle bits (set to the binary one value) per time period and (2) a last "n" count of busy idle bits (set to the binary one value) per time period. To calculate the running average, a newly acquired count of busy idle bits per time period is averaged with a stored average if the count for the busy idle bits for the immediately preceding interval is higher than a value of one standard deviation lower than the stored average. Prior to transmitting a location data message via the cellular network control channel 38, the cellular paging device 30 will average the stored last "n" counts of busy idle bits per time period and compare that computed "n" average to the stored running average. If the computed "n" average drops below the stored running average, then the cellular transmitter 86 outputs the identification signal carrying the location data message via the RECC of the control channel 38. However, if the computed "n" average exceeds the stored running average, then the cellular transmitter 86 will delay the transmission.

In contrast to conventional radiotelephone units, which are responsive to an instantaneous view of activity on the control channel, it will be appreciated that the above-described transmission queuing process is a heuristic method based upon a deterministic analysis of the stream of busy idle bits.

In this manner, the cellular transmitter 86 transmits the location data message only when the cellular network control channel 38 is available for clear use by the cellular paging device 30. This form of message queuing minimizes the possibility that the operation of numerous cellular paging devices 30 within the cell 12 will interfere with normal telephone conversations involving the operating radiotelephones within the cell. It will be understood that this message cueing technique may delay the transmission of the location data message if the cellular network control channel 38 is busy. Nevertheless, for another embodiment, it will be appreciated that the cellular transmitter 86 also can transmit the identification signal without first checking the availability of the control channel 38.

Alternatively, the cellular paging device 30 can be programmed to transmit the location data message during a certain time interval, such as during the early morning hours between midnight and 6 AM, when control signal traffic is normally at a minimal level. To permit this type of automated transmission operation, the cellular paging device 30 includes a clock 92 connected to the controller 74. The clock 92 outputs a clock signal in response to expiration of a time interval. In response to the clock signal, the controller 74 initiates a transmission of the identification signal by the cellular transmitter 86. However, this transmission will occur only if the cellular receiver 84 has received a non-matching system identification code within a predefined time period prior to the receipt of the clock signal. In this manner, the location data message is transmitted during a known can controllable time interval by a cellular paging device 30.

The clock 92 preferably outputs the clock signal during the time period when use of the control channel 38 is at a reduced level, thereby minimizing the possibility that the cellular paging device 30 will interfere with the normal communications operations of the CMR system 8. In particular, the time interval is preferably selected with advance knowledge of the reduced activity periods for conventional telephone conversation traffic on the CMR system 8 to ensure that location data message transmissions by the various cellular paging device 30 in the cell 12 are conducted on a noninterference basis with voice call processing messages transmitted to and from the radiotelephones operating in the cell. The clock 92 can be implemented as either a hardware counter or as a software counter implemented by coded instructions executed by the controller 74.

Although the time interval for the clock 92 is preferably selected to minimize any interference from location data message transmissions, it is still possible that the cellular network control channel 38 may be busy when the clock 92 outputs the clock signal to initiate a transmission by the cellular transmitter 86. To minimize this possible interference problem, the location data message transmission can be delayed until the cellular paging device 30 detects a level of activity on the control channel 38 that is less than a certain threshold for a predetermined time period. Although this delays a location data message transmission that normally would have taken place in direct response to the clock signal, the delay allows the cellular paging device 30 to transmit the location data message during an interval when the CMR system 8 is not busy.

For this embodiment, the controller 74 responds to the clock signal output by the clock 92 by detecting the busy idle bits set to a binary one value, as carried by the FOCC and received via the cellular receiver 84, and calculating both the running average and the "n" average. This running average is stored within the memory storage device 88. The controller 74 will supply a data packet containing the selected data to the cellular transmitter 86 only when the computed "n" average drops below the stored running average. It will be appreciated that this process of queuing the transmission of location data messages typically requires the storage of the selected data within the memory 88 prior to initiating the location data message transmissions.

Figure 4A:
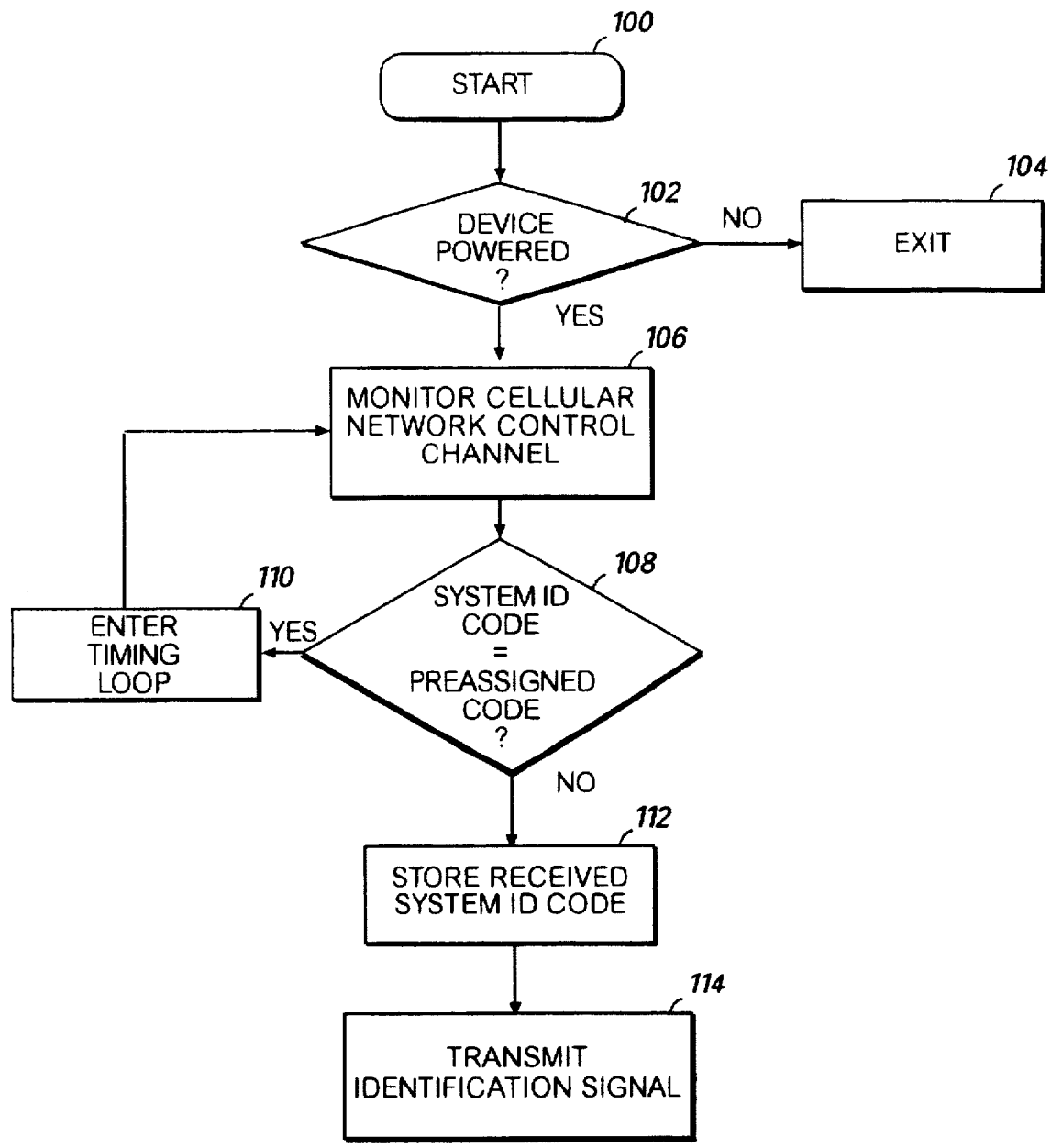

FIGS. 4A, 4B, and 4C, collectively described as FIG. 4, are logical flow diagrams that illustrate the preferred steps taken by the pager identification system 10 to identify the present location of a cellular paging device that has moved from one service area to another within a segmented paging system. Referring now to FIGS. 1 and 4A, the process begins at the START step 100 and proceeds to conduct an inquiry in step 102. In step 102, a determination is made whether the cellular paging device 30 is powered "ON" to support the paging operations. If not, the "NO" branch is followed from step 102 to step 104 and the process terminates. In contrast, if the response to the inquiry is positive, then the "YES" branch is followed from step 102 to step 106. In step 106, the cellular paging device 30 monitors the cellular network control channel 38 for a signal containing the system identification code for the CMR system 8. It will be appreciated that the typical CMR system frequently generates a signal containing its system identification code on a reasonably frequent basis to advise all mobile radio telephone units within its coverage area of the identity of the CMR system.

In response to receiving a system identification signal from the CMR system 8 containing a system identification code, an inquiry is conducted by the cellular paging device 30. This inquiry determines whether the received system identification signal matches a preassigned code, such as a preassigned identifier for the CMR system associated with the segmented paging system 31, maintained by the cellular paging device. The cellular paging device 30 preferably stores one or more preassigned codes, typically system identification codes associated with CMR systems, within a memory storage device. Each stored system identification code identifies the verification system 40 for the cellular paging device 30. Because the coverage areas of different CMR systems can map to a single service area for a segmented paging system, the cellular paging device 30 can store system identification codes for each of these CMR systems. In the event that the system identification code carried by the received system identification signal matches a stored system identification code, the "YES" branch is followed from step 108 to step 110. In step 110, the cellular paging device preferably enters a "SLEEP" mode to conserve electrical power for a time period defined by a timing loop. Upon expiration of this time period, the process branches to step 106 to begin monitoring operations.

In the event that the received system identification code does not match the stored system identification code(s), the "NO" branch is followed from step 108 to step 112. The system identification code received by the cellular paging device 30 is stored within a memory storage device in step 112. Storage of the received system identification code permits subsequent use of this identifier by the cellular paging device 30. In step 114, the cellular paging device 30 can prepare a location data message and transmit an identification signal carrying the location data message via the cellular network control channel 38. This identification signal includes the identification code identifying the source of the identification signal and the received system identification code. The identification signal is preferably formatted to appear as an Autonomous Registration signal for a conventional cellular mobile radiotelephone system. Consequently, the MSC 24 will operate upon the identification signal as if it were an Autonomous Registration signal output by a conventional mobile radiotelephone.

Turning now to FIGS. 1 and 4B, the MSC 24 receives the identification signal from the cellular paging device 30 via the cellular network control channel 38 in step 120. Because the identification signal is formatted to appear as an Autonomous Registration signal, the MSC 24 responds to the identification signal by conducting autonomous registration tasks. At decision block 122, if the received MIN is a MIN associated with a home unit having an entry in the database of the MSC 24, then the "YES" branch is followed to step 124. In step 124, the MSC 24 registers the "home" mobile radiotelephone unit. It is highly likely that at least some of the conventional mobile radiotelephones operating within the cell 12 represents subscribers to the cellular services offered by the CMR system. Consequently, those mobile radiotelephones will be identified as home mobile radiotelephone units serviced by the CMR system 8. In contrast, the transmissions by the cellular paging device 30 operating within the cell 12 are likely to appear as transmissions from roamers associated with a foreign or remote CMR system, such as the verification system 40.

If the received MIN is not a "home" MIN, i.e., an identifier for the CMR system associated with the MSC 24, then the "NO" branch is followed to step 126. Consequently, the MSC 24 determines in step 126 that the source of the identification signal is a roamer. The MSC 24 makes this determination based on the predetermined identifying characteristic of the identification code, which is located in a data field that corresponds to MIN for a conventional radiotelephone unit. At least a portion of the identification code identifies the verification system 40 as the CMR system for this roamer. Consequently, the MSC 24 reaches the conclusion that the identification signal has been transmitted by a roamer associated with a remote CMR system, specifically the verification system 40.

At decision block 128, the MSC 24 checks its database to determine whether the roamer's MIN is present in the database as a result of an earlier registration with the CMR system 8. As explained in more detail below, the MSC 24 normally will not locate the predetermined identifying characteristic of the identification code within this database because the identification signal has been transmitted by a cellular paging device 30 rather than by a conventional radiotelephone unit that is associated with this CMR system 8. If the response to this inquiry is negative, the "NO" branch is followed to step 130 and the MSC 24 forwards the location data message as a data packet to the verification system 40 via the communications network 42. This data packet includes the identification code in the received system identification code provided by the location data message. In response, the data collection system 40 recognizes that the data packet contains a location data message and typically stores the data within a memory to facilitate subsequent uses of this data.

At decision block 132 an inquiry is conducted to determine whether the MSC 24 has received a verification signal from the verification system 40. The verification signal confirms that the source of the identification signal, specifically the cellular paging device 30 is a valid user of its "home" CMR system, namely the verification system 40. In addition, this verification signal which is also known as a validation signal, advises the MSC 24 that the cellular paging device 30 is not authorized to receive or to place cellular phone calls. This prevents the possibility that the MSC 24 may inadvertently attempt to route a telephone conference to or from the cellular paging device 30. In the event that the MSC 24 receives the verification signal, the "YES" branch is followed to step 134 and the roamer's MIN is added to the database of the MSC 24. Otherwise, the "NO" branch is followed from step 132 to step 136. In step 136, the MSC 24 determines that the cellular paging device 30 is an invalid user and terminates the Autonomous Registration operation.

If the roamer's MIN is contained in the database of the MSC 24, then the steps 130, 132 and 134 are jumped by following the "YES" branch from step 128 to decision block 228.

Information concerning the roamer, i.e., the cellular paging device 30, is added, at least temporarily, to the database at the MSC 24 during step 134 in response to the verification signal. However, at step 138, an inquiry is conducted to determine if the MSC 24 has received an instruction from the verification system 40 which requests the deletion of the roamer information from the database. If the response to this inquiry is positive, the "YES" branch is followed to step 140 and the MSC 24 deletes the entry from its database. In this matter, the MSC database is not cluttered with information that is no longer relevant to the operations of the MSC 24. In contrast, if the response to the inquiry is negative, then the "NO" branch is followed back to the step 138.

Referring now to FIGS. 1 and 4C, the verification system 40 receives the location data message from the MSC 24 via the communications network in step 150. In response, the verification system 40 forwards the identification code and the received system identification code of the location data message to the segmented paging system 31 via the communications network 42. This communication of the data supplied by the location data message is completed in step 152. In response, in step 154, the segmented paging system 31 maps the received system identification code to the service areas supported by the segmented paging system. This allows the segmented paging system 31 to update the paging services for the particular cellular paging device 30 to the present service are associated with the received system identification code. In step 156, the database of the message service center 46 is updated to reflect the new service area that the cellular paging device 30 has entered as result of the subscriber moving this pager from one service area to another. In the event that a page is received by the central message center 46 for this cellular paging device 30, the page is transmitted in only this new service area for the cellular paging device 30. Upon completing the update of the database of the segmented paging system 31, the process returns to step 110 of FIG. 4A.

The steps shown in FIGS. 4A, 4B and 4C are preferably implemented by one or more computer software routines. The software development techniques necessary to code this process and to create the software routines are known by those skilled in the art.

For another embodiment of the paging identification system 10, a cellular paging device 30' monitors the cellular network control channel 38 and, in response to detecting a system identification signal that is not associated with its host CMR system, issues a prompt or alert to the subscriber. This prompt advises the subscriber that the cellular paging device 30' is now operating outside of its local service area. This reminds the subscriber to call the service provider for the segmented paging system 31 and to register operation of the pager in the new service area. The subscriber can typically register the new service area for the cellular paging device 30' by calling a tollfree telephone number and by entering the identification code for the cellular paging device 30', a personal identification number (PIN), and the area code of the new service area. Consequently, it will be appreciated that this alternative embodiment supports an automated reminder or prompt to the subscriber to register with the paging service the new location of the cellular paging device.

For this alternative embodiment, the cellular paging device 30' typically obtains the system identification code from the CMR system servicing its present service area by monitoring the cellular network control channel 38. These monitoring activities are typically begun in response to powering the device. Upon obtaining the system identification signal, the cellular paging device 30' compares the received system identification signal to the preassigned code stored in its memory. In the event that the received system identification signal does not match the store preassigned code, the cellular paging device 30' issues a prompt or alert to the subscriber. This prompt can be interpreted by the subscriber as an indication that the cellular paging device 30' has moved from a first service area to a second service area of the segmented paging system 31. The cellular paging device 30' can deliver this prompt in a conventional manner, such as an audible tone, an alphanumeric message, or a tactile alert. Regardless of the form of the prompt, the subscriber will recognize the nature of the alert and respond by registering the cellular paging device 30' for operation in the new service area. In this manner, the segmented paging system 31 can maintain updated records regarding the location of the cellular paging devices 30 operating within its service areas.

Because the cellular paging device 30' is not required to transmit over the cellular network control channel 38 in this alternative embodiment, the cellular paging device 30 can be modified to remove the transmission capabilities offered by the cellular transmitter 86. This modification may be appropriate to address economical issues and to resolve weight and size constraints. Consequently, the cellular communications device 72 can be modified to include only a signal reception capability, the cellular receiver 84, the memory storage device 88, and the antenna 90, for this alternative embodiment.

In view of the foregoing, it will be understood that the present invention provides benefits to both the paging service provider and to subscribers. The present invention promotes the efficient use of the transmission facilities of a segmented paging system by updating the service area locations for its paging devices without a need for manual intervention by a subscriber. Moreover, a paging service subscriber is no longer burdened with a need to call the paging service and to update the registration of his or her paging device upon movement of the paging device from one service area to another.

In summary, the present invention provides a system for identifying which one of the service areas a particular one of the pagers is located when a particular pager, also described as a cellular paging device, is moved from a first service area to a second service area. First, a determination is made that the particular pager has indeed moved from the first service area to the second service area. In recognition that the particular pager has changed service areas, an identification signal is transmitted from the particular pager via a cellular network control channel to a cellular mobile radiotelephone (CMR) system operating within the second service area. This identification signal contains location data identifying the particular pager as the source of the identification signal and identifying the CMR system. The location data is then forwarded to the paging system via a communications network connected between the CMR system and the paging system. In response, the second service area is identified as the location of the particular pager based on the processing of the location data.

It should be understood that the particular embodiments described herein have been disclosed by way of example and that other modifications may occur to those skilled in the art without departing from the scope and spirit of the appended claims.

We claim:

1. In a radiopaging system having a plurality of cellular paging devices and a plurality of service areas, a method for identifying in which one of the service areas a particular one of the cellular paging devices is located when the particular cellular paging device is moved from a first one of the service areas to a second one of the service areas, comprising the steps of:

determining at the particular cellular paging device that it has moved from the first service area to the second service area;

responsive to the determination by the cellular paging device that it has moved from the first service area to the second service area, transmitting via a cellular network control channel an identification signal from the particular cellular paging device to a cellular mobile radiotelephone (CMR) system having an array of cells, at least one of the cells of the CMR system overlapping with the second service area of the radiopaging system, the identification signal containing location data identifying the particular cellular paging device as the source of the identification signal and identifying the CMR system;

forwarding the location data from the CMR system to the radiopaging system; and identifying the second service area as the location of the particular cellular paging device in response to processing the location data at the radiopaging system based on a mapping of the services areas of the radiopaging system to the array of cells of the CMR system.

2. The method of claim 1, wherein the determining step comprises:

receiving a system identification signal by the particular cellular paging device via the cellular network control channel, the received system identification signal identifying the CMR system;

comparing the received system identification signal to a preassigned code maintained by the particular cellular paging device; and determining the particular cellular paging device has moved from the first service area if the received system identification signal does not match the preassigned code.

3. The method of claim 2, wherein the location data comprises the received system identification signal and an identification code that uniquely identifies the particular cellular paging device as the source of the identification signal.

4. The method of claim 1, wherein the identification signal is formatted to correspond to a registration signal transmitted by a cellular mobile radiotelephone unit when the cellular mobile radiotelephone unit first identifies itself to the CMR system, the registration signal comprising data fields for a mobile telephone number and an electronic serial number (ESN).

5. The method of claim 4, wherein the identification code corresponds to at least a portion of the mobile telephone number and the received system identification signal corresponds to at least a portion of the ESN.

6. The method of claim 1, wherein the transmitting step comprises the steps of:

monitoring the cellular network control channel to detect a stream of busy idle bits for a predetermined time period, each of the busy idle bits indicating whether a source has initiated a communication with the CMR system via the cellular network control channel;

determining the level of communications activity for the CMR system based on the status of the busy idle bits; and transmitting the identification signal to the CMR system when the level of communications is below a certain minimum threshold.

7. The method of claim 1 further comprising the step of updating a database of the radiopaging system to reflect that the particular cellular paging device is operating in the second service area.

8. The method of claim 7, wherein the radiopaging system subsequently sends a paging message to the particular cellular paging device by transmitting the paging message in only the second service area.

9. The method of claim 1, wherein the particular cellular paging device is operative to receive paging messages from the radiopaging system and to communicate with the CMR system when it is operating within one of the service areas of the radiopaging system that overlaps one of the cells of the CMR system.

10. In a segmented radiopaging system having a plurality of cellular paging devices and a plurality of service areas, a method for identifying which one of the service areas a particular one of the cellular paging devices is located when the particular cellular paging device is moved from a first service area to a second service area, comprising the steps of:

monitoring a cellular network control channel of a cellular mobile radiotelephone (CMR) system by the particular cellular paging device to obtain a system identification signal that identifies the CMR system, the CMR system having an array of cells, at least one of the cells of the CMR system overlapping with the second service area of the radiopaging system;

comparing the system identification signal of the CMR system to a preassigned code maintained by the particular cellular paging device;

in the event that the received system identification signal does not match the preassigned code, then transmitting an identification signal from the particular cellular paging device via the cellular network control channel, the identification signal containing location data identifying the particular cellular paging device as the source of the identification signal and identifying the CMR system;

forwarding the location data from the CMR system to the radiopaging system; and identifying the second service area as the location of the particular cellular paging device in response to processing the location data at the radiopaging system based on a mapping of the services areas of the radiopaging system to the array of cells of the CMR system.

11. The method of claim 10, wherein the location data comprises an identification code that uniquely identifies the particular cellular paging device as the source of the identification signal and the received system identification signal.

12. The method of claim 11, wherein the identification signal is formatted to correspond to a registration signal transmitted by a cellular mobile radiotelephone unit when the cellular mobile radiotelephone unit first identifies itself to the CMR system, the registration signal comprising data fields for a mobile telephone number and an electronic serial number (ESN), the identification code corresponds to at least a portion of the mobile telephone number and the received system identification signal corresponds to at least a portion of the ESN.

13. The method of claim 10, wherein the transmitting step comprises the steps of:

monitoring the cellular network control channel to detect a stream of busy idle bits for a predetermined time period, each of the busy idle bits indicating whether a source has initiated a communication with the CMR system via the cellular network control channel;

determining the level of communication activity for the CMR system based upon the status of the busy idle bits; and transmitting the identification signal to the CMR system when the level of communications is below a certain minimum threshold.

14. The method of claim 10 further comprising the steps of updating a database of the segmented radiopaging system in response to processing the location data to reflect that the particular cellular paging device is operating in the second service area, and sending a paging message from the segmented radiopaging system to the particular cellular paging device by transmitting the paging message in only the second service area.

15. A system for sending paging messages only to the present location of a particular one of a plurality of cellular paging devices, comprising:

a radiopaging system for transmitting the paging messages to the cellular paging devices in service areas of the radiopaging system;

a cellular mobile radiotelephone (CMR) system having an array of cells and a cellular network control channel for data communications within the cell array, at least one of the cells of the CMR system overlapping with one of the service areas of the radiopaging system, each cellular paging device capable of communicating with the CMR system via the cellular network control channel when the cellular paging device enters the cell array;

each cellular paging device, in response to determining that it has moved from a first one of the services areas to a second one of the service areas, operative to transmit via the cellular network control channel an identification signal to the CMR system, the identification signal containing location data identifying the particular cellular paging device as the source of the identification signal and identifying the identity of the CMR system, the CMR system, responsive to the identification signal, operative to forward the location data to the radiopaging system via a communications network connected between the CMR system and the radiopaging system, and the radiopaging system, responsive to the location data including the identity of the CMR system, operative to identify the second service area as the location of the particular cellular paging device based on a mapping of the services areas of the radiopaging system to the array of cells of the CMR system the radiopaging system, responsive to identifying the second service area as the location of the particular cellular paging device, operative to send one of the paging messages to the particular cellular paging device by transmitting the paging message in only the second service area.

16. The system of claim 15, wherein the particular cellular paging device is operative to determines that it has moved from the first service area in response to:

receiving a system identification signal via the cellular network control channel, the received system identification signal identifying the CMR system;

comparing the received system identification signal to a preassigned code maintained by the particular cellular paging device, the preassigned code identifying a CMR system associated with the radio paging system; and determining the particular cellular paging device has moved from the first service area in the event that the received system identification signal does not match the preassigned code.

17. The system of claim 16, wherein the location data comprises the received system identification signal and an identification code which uniquely identifies the particular cellular paging device as the source of the identification signal.

18. The system of claim 15, wherein the identification signal is formatted to correspond to a registration signal transmitted by a cellular mobile radiotelephone unit when the cellular mobile radiotelephone unit first identifies itself to the CMR system, the registration signal comprising data fields for a mobile telephone number and an electronic serial number (ESN).

19. The system of claim 18, wherein the identification code corresponds to at least a portion of the mobile telephone number and the received system identification signal corresponds to at least a portion of the ESN.

20. The system of claim 15, wherein the particular cellular paging device monitors the cellular network control channel to detect a stream of busy idle bits for a predetermined time period, each of the busy idle bits indicating whether a source has initiated a communication with the CMR system via the cellular network control channel, and determines the level of communications activity for said CMR system based on the status of the busy idle bits.

21. The system of claim 20, wherein the particular paging device, responsive to the level of communications activity falling below a certain minimum threshold, transmits the location data to the CMR system.

22. The system of claim 15, wherein the radiopaging system, in response to processing the location data, updates a database of the radiopaging system to reflect that the particular cellular paging device is operating in the second service area.

23. The system of claim 22, wherein the radiopaging system, in response to updating the database, is operative to send one of the paging messages to the particular cellular paging device by transmitting the paging message in only the second service area.

24. In a segmented radiopaging system for transmitting paging messages to cellular paging devices in service areas of the segmented radiopaging system, a system for sending paging messages only to the present location of a particular one of the cellular paging devices, comprising:

a cellular mobile radiotelephone (CMR) system having an array of cells, a mobile switching center (MSC), and a cellular network control channel for data communications within the cell array, at least one of the cells of the CMR system overlapping with one of the service areas of the radiopaging system, the MSC operative to transmit a system identification signal identifying the CMR system, each cellular paging device capable of communicating with the MSC via the cellular network control channel when the particular cellular paging device enters the cell array;

the particular cellular paging device, responsive to the system identification signal, determines that it has moved from a first one of the service areas to a second one of the service areas, and transmits via the cellular network control channel an identification signal to the MSC, the identification signal containing the received system identification signal and an identification code that uniquely identifies the particular cellular paging device as the source of the identification signal, the MSC, responsive to the identification signal, operative to forward the identification code and the received system identification signal to the segmented radiopaging system via a communications network connected between the MSC and the segmented radiopaging system, and the segmented radiopaging system, responsive to the identification code and the received system identification signal, operative to identify the second service area as the location of the cellular paging device based on a mapping of the services areas of the radiopaging system to the array of cells of the CMR system, the segmented radiopaging system, responsive to identifying the second service area as the location of the particular cellular paging device, operative to send one of the paging messages to the particular cellular paging device by transmitting the paging message in only the second service area.

25. The system of claim 24, wherein the identification signal is formatted to correspond to a registration signal transmitted by a cellular mobile radiotelephone unit when the cellular mobile radiotelephone unit first identifies itself to the CMR system, the registration signal comprising data fields for a mobile telephone number and an electronic serial number (ESN).

26. The system of claim 25, wherein the identification code corresponds to at least a portion of the mobile telephone number and the received system identification signal corresponds to at least a portion of the ESN.

27. The system of claim 24, wherein the particular cellular paging device is operative to monitor the cellular network control channel to detect a stream of busy idle bits for a predetermined time period, each of the busy idle bits indicating whether a source has initiated a communication with the CMR system via the cellular network control channel, and to determine the level of communications activity for the CMR system based upon the status of the busy idle bits, the particular cellular paging device being further operative to transmit the location data to the CMR system in response to the level of communications activity falling below a certain minimum threshold.

28. The system of claim 24, wherein the segmented radiopaging system, in response to processing the location data, updates a database to reflect that the particular cellular paging device is operating in the second service area, and is thereafter operative to send one of the paging messages to the particular cellular paging device by transmitting the paging message in only the second service area.

29. A cellular paging device for use with an improved segmented radiopaging system having a plurality of service areas for transmitting paging messages and a cellular mobile radiotelephone (CMR) system having an array of cells, a mobile switching center (MSC), and a cellular network control channel for data communications within the cell array, at least one of the cells of the CMR system overlapping with one of the service areas of the segmented radiopaging system, the MSC operative to transmit a system identification signal identifying the CMR system, the cellular paging device comprising:

a paging device for receiving paging messages from the radiopaging system;

a cellular communications device for receiving the system identification signal from the MSC via the cellular network control channel;

a memory storage device, connected to the cellular communications device, for storing a preassigned code;

a controller, connected to the cellular communications device, for comparing the received system identification signal to the preassigned code and, in the event that the preassigned code does not match the received system identification signal, outputting a transmission command to the cellular communications device, the cellular communications device, responsive to the transmission command, for transmitting via the cellular network control channel an identification signal to the MSC, the identification signal containing the received system identification signal and an identification code uniquely identifying the cellular communications device, the MSC, responsive to the identification signal, is operative to forward the received system identification signal and the identification code to the segmented radiopaging system via a communications link, the segmented radiopaging system, responsive to the received system identification signal identifying the CMR system and the identification code, is operative to identify the particular one of the service areas in which the cellular paging device is located based on a mapping of the services areas of the radiopaging system to the array of cells of the CMR system.

30. The cellular paging device of claim 29, wherein the identification signal is formatted to correspond to a registration signal transmitted by a cellular mobile radiotelephone unit when the cellular mobile radiotelephone unit first identifies itself to the CMR system, the registration signal comprising data fields for a mobile telephone number and an electronic serial number (ESN), the identification code corresponding to at least a portion of the mobile telephone number and the received system identification signal corresponding to at least a portion of the ESN.

31. The cellular paging device of claim 29, wherein the cellular communications device is operative to monitor the cellular network control channel to detect a stream of busy idle bits for a predetermined time period, each of the busy idle bits indicating whether a source has initiated a communication with the CMR system via the cellular network control channel, and to determine the level of communications activity for the CMR system based upon the status of the busy idle bits, the cellular communications device being further operative to transmit the received system identification signal and the identification code to the CMR system when the level of communications activity falls below a certain minimum threshold.

32. The cellular paging device of claim 29, wherein the segmented radiopaging system, in response to processing the received system identification signal and the identification code, updates a database to reflect the particular one of the service areas that the cellular paging device is located, and can thereafter send a selected one of the paging messages to the cellular paging device by transmitting the selected paging message in only the particular service area.

33. In a segmented radiopaging system having a plurality of cellular paging devices and a plurality of service areas, a method for supplying an alert when a particular one of the cellular paging devices is moved from a first service area to another service area, comprising the steps of:

monitoring a cellular network control channel of a cellular mobile radiotelephone (CMR) system by the particular cellular paging device to obtain a system identification signal that identifies the CMR system, the CMR system having an array of cells, at least one of the cells of the CMR system overlapping with one of the service areas of the radiopaging system;

comparing the system identification code of the CMR system to a preassigned code maintained by the particular cellular paging device;

in the event that the received system identification signal does not match the preassigned code, then determining at the particular cellular paging device that it has moved from the first service area; and responsive to the determination by the cellular paging device that it has moved from the first service area, generating a prompt signal by the particular cellular paging device to alert a user that the particular cellular paging device is operating outside of the first service area of the radiopaging system.

34. The system of claim 33, wherein the prompt signal is a local alert that prompts the user to register for operation of the particular cellular paging device within another one of the service areas.

35. The system of claim 34, wherein the prompt signal comprises one of an audible tone, alphanumeric message, and tactile alert.

36. The system of claim 33, wherein the radiopaging system is operative to update its records relating to the operating location of the particular cellular paging device in response to the user registering for operation of the particular cellular paging device within another one of the service areas.

37. The system of claim 24, wherein the particular cellular paging device is operative to determine that it has moved from the first service area in response to:

receiving a system identification signal via the cellular network control channel, the received system identification signal identifying the CMR system;

comparing the received system identification signal to a preassigned code maintained by the particular cellular paging device, the preassigned code identifying a CMR system associated with the radiopaging system; and determining the particular cellular paging device has moved from the first service area in the event that the received system identification signal does not match the preassigned code.

\* \* \* \* \*